United States Patent
Davidyan et al.

[11] 3,880,496
[45] Apr. 29, 1975

[54] ATTACHABLE POLARIZED INNER WINDOW FOR CONVEYANCES

[75] Inventors: G. Kurt Davidyan, Gladwyne, Pa.; Richard W. Kraus, Claymont; Robert D. Patrick, Wilmington, both of Del.; Leo R. Scott, Wyomissing Hills, Pa.

[73] Assignee: American Polarizers, Inc., Reading, Pa.

[22] Filed: June 4, 1973

[21] Appl. No.: 366,457

[52] U.S. Cl. .............................. 350/156; 350/159
[51] Int. Cl. ........................................... G02b 5/30
[58] Field of Search .................... 350/156, 159, 276

[56] References Cited
UNITED STATES PATENTS
2,989,787   6/1961   Smith .............................. 350/159 X

*Primary Examiner*—John K. Corbin
*Attorney, Agent, or Firm*—Smith, Harding, Earley & Follmer

[57] ABSTRACT

A frame member has a rearwardly extending peripheral flange adapted to be inserted into a window recess. A polarizer is rotatably mounted on the frame member forwardly of the flange and a mask is mounted on the frame forwardly of the rotatable polarizer. A second polarizer is fixedly mounted on the frame forwardly of the mask. The rotatable polarizer is mounted in spaced guide members which are secured in registering recessed portions of the frame member. The rotatable polarizer has a depending portion which is secured to an elongated handle the ends of which are spaced away from the polarizer to provide for the rotation of the handle beyond the adjacent guide members, the depending portion acting to limit the rotation of the rotatable polarizer by engagement with the adjacent guide members. A contact adhesive is secured to the back of the frame or alternatively openings for securing screws are provided.

3 Claims, 7 Drawing Figures

ATTACHABLE POLARIZED INNER WINDOW FOR CONVEYANCES

BACKGROUND OF THE INVENTION

The employment together of a fixed and a rotatable polarizer as a light filter is well known to the art. A polarizer is a light transmitting sheet having its optic axis in the plane of the sheet and having incorporated in the sheet a polarizing material adapted to transmit only that component of an incident beam of visible light vibrating perpendicularly to the optic axis of the sheet. When the axes of the two polarizers are parallel they will transmit this light with a minimum of absorbtion. On the other hand, when one of the two polarizers is rotated so as to cross the axes, the amount of visible light transmitted will be gradually decreased with the rotation, a minimum amount of light being transmitted after 45° of rotation. A typical example of a polarizer is a uniaxial sheet of polyvinyl alcohol having its optic axis in the plane of the sheet and having incorporated therein a polarizing polyiodide with the polyvinyl alcohol sheet being laminated between two sheets of glass or plastic. Such a polarizer is disclosed in U.S. Pat. No. 2,237,567 issued Apr. 8, 1941 which is incorporated herein by reference.

Polarized windows have been employed heretofore in conveyances. Since a typical use is in aircraft the discussion hereinafter will relate to aircraft. The polarized windows used heretofore in aircraft have been built in as permanent installations behind the panels forming the finished interior surface of the aircraft. This necessarily involves complexity and expense and makes maintenance such as cleaning and repairing expensive and difficult. The polarized windows of the invention are readily attachable and equally readily removable for maintenance. Their construction permits a wide variation in the appearance of the window providing for a substantial variation in the appearance of the interior design of the aircraft. The mounting and operation of the rotatable polarizer is advantageous over the prior art.

DETAILED DESCRIPTION

Figure 2:
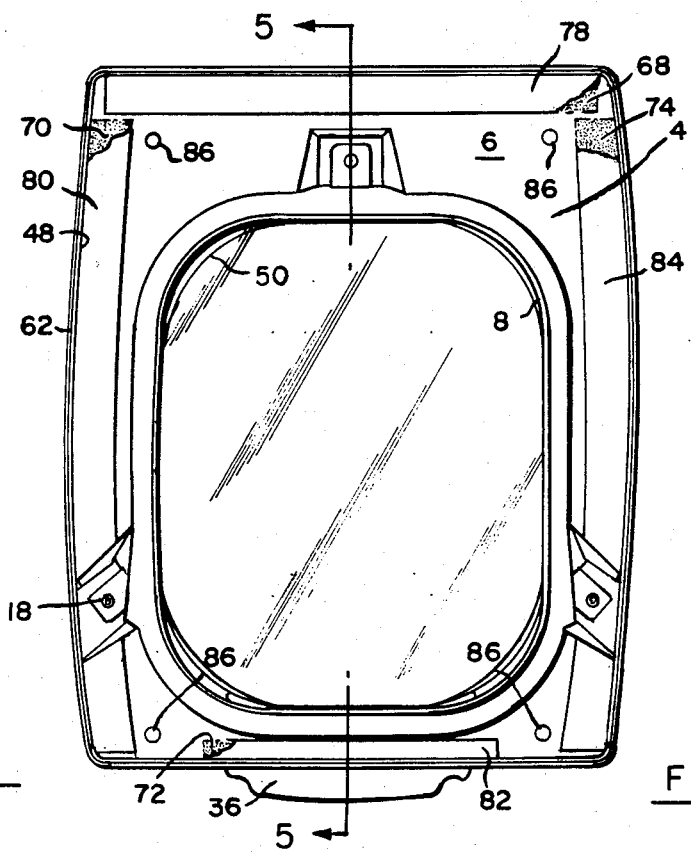
FIG. 2 is a rear elevation of the window of FIG. 1.
Figure 3:
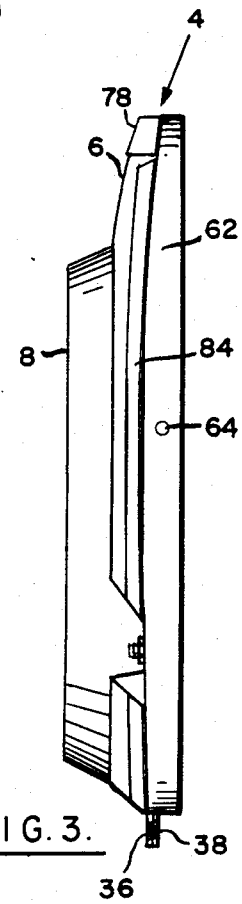
FIG. 3 is a side elevation of the window of FIG. 1.
Figure 4:
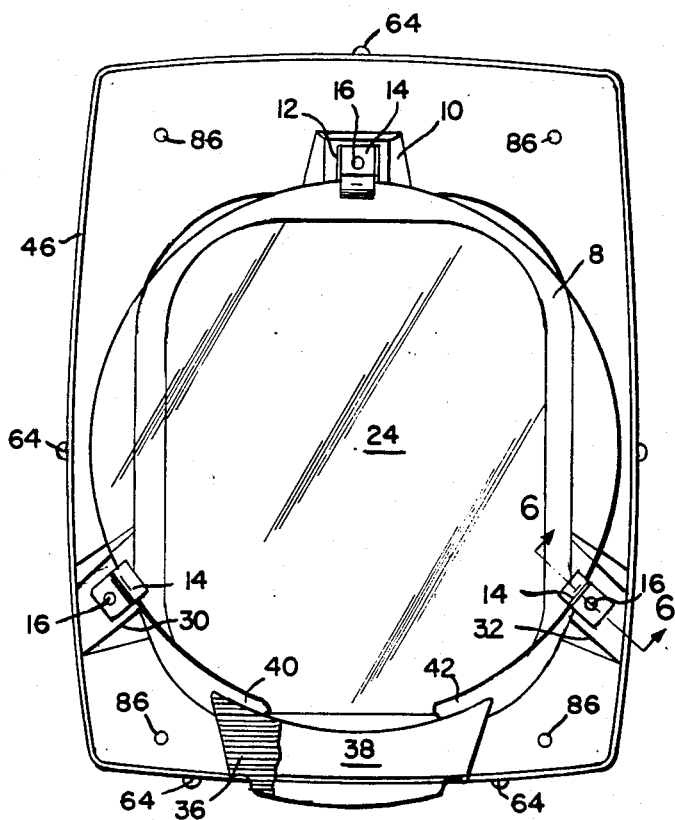
FIG. 4 is a front elevation of the window of FIG. 1 with the fixed polarizer and the mask removed.

An attachable polarized inner window 2 has, as best seen in FIGS. 2, 3 and 4, a frame member 4 having a back 6 and a rearwardly extending peripheral flange 8 which tapers inwardly as it extends rearwardly. Flange 8 is adapted to be inserted into a window recess.

Frame member 4 has a forwardly extending boss 10 (FIG. 4) with a recessed portion 12 which registers with a guide member 14 secured by a machine screw 16 and a nut 18. Guide 14 has an offset U-shaped portion 19 which carries a U-shaped felt member 20 which receives the edge of rotatable polarizer 24. Two additional guides 14, 14 are similarly mounted on the bosses indicated at 30 and 32 respectively. Polarizer 24 has a depending portion 36 which is adhesively secured to an elongated handle 38. Depending portion 36 and handle 38 together with the main portion of polarizer 24 form slots 40 and 42 adjacent opposite ends of handle 38 (FIG. 4).

Figure 5:
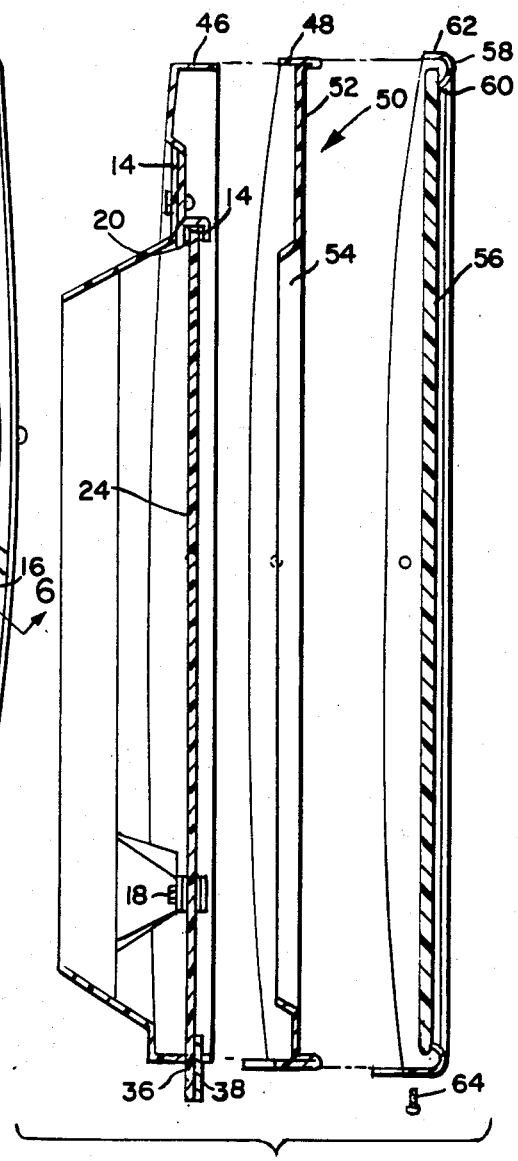
FIG. 5 is an exploded view of a section taken on the plane indicated by the line 5—5 in FIG. 2.
Figure 6:
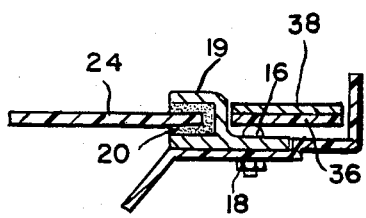
FIG. 6 is a section taken on the plane indicated by the line 6—6 in FIG. 4 with the rotatable polarizer rotated fully clockwise as viewed in FIG. 4.

Frame member 4 has a forwardly extending peripheral flange 46 which is overlapped by peripheral flange 48 of mask 50 (FIG. 5). Flange 48 extends to either side of panel 52 of mask 50, panel 52 having a rearwardly extending inner peripheral flange portion 54. A polarizer 56 overlies panel 52 within the peripheral flange 48. A border member 58 has a peripheral rearwardly extending lip portion 60 which bears against polarizer 56 and a peripheral flange 62 which overlies flange 48.

The assembled flanges 46, 48 and 62 are held together by screws 64.

To permit ready securing of the window 2, it is provided with contact adhesive strips 68, 70, 72 and 74 secured to the back 6 of frame member 4 and covered with removable protective strips 78, 80, 82 and 84 respectively. In the event it is desired to employ a bolt such as an expansible bolt (Wellnut) to secure the window 2, there are provided a plurality of bolt holes 86 in back 6.

Figure 1:
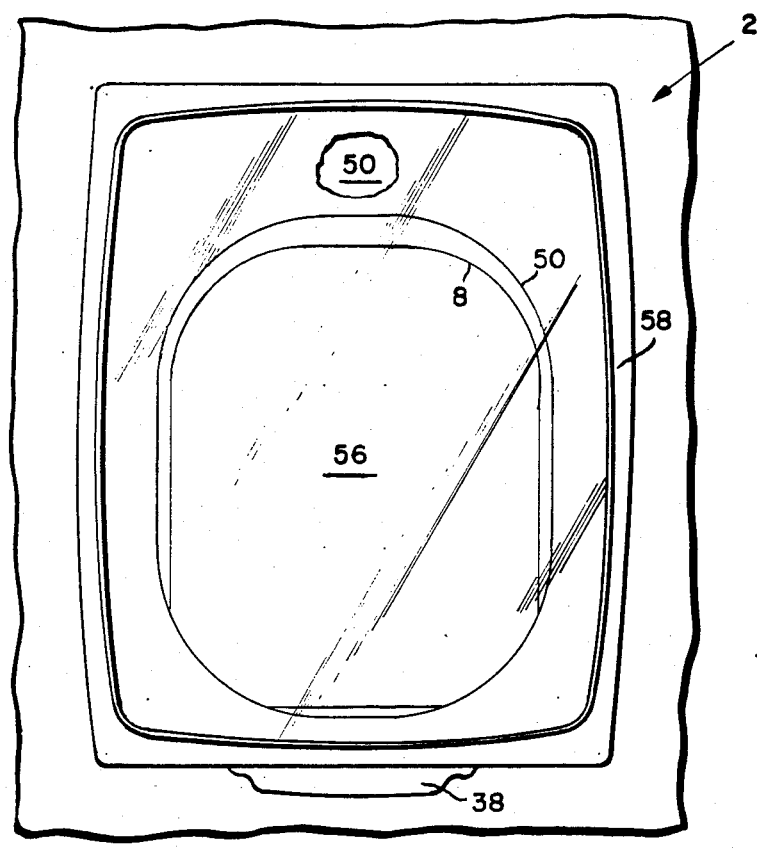
FIG. 1 is a front elevation of an installed polarized window in accordance with the invention.

Polarizers 24 and 56 are oriented so that their axes are parallel when depending portion 36 and handle 38 are moved as far counterclockwise, as viewed in FIG. 1, as possible thus providing for the maximum transmission of light through the window with the handle in this position. The minimum transmission of light is achieved by moving depending portion 36 and handle 38 as far clockwise, as viewed in FIG. 1, as possible. The clockwise and counterclockwise rotation of polarizer 24 is limited by the depending portion 36 of polarizer 24 engaging the guides 14, 14 at the inner ends of slots 40 and 42 respectively.

INSTALLATION

Figure 7:
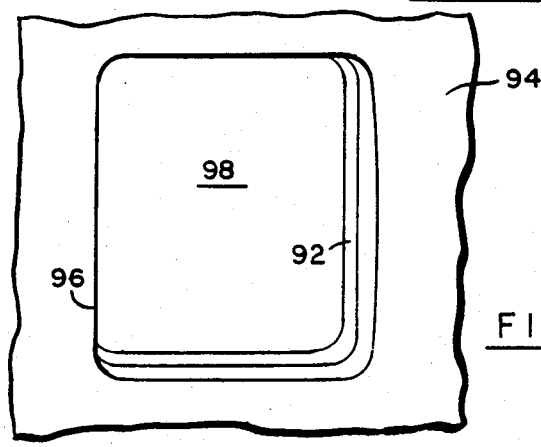
FIG. 7 is a perspective view, partially broken away, of a typical aircraft window to which the polarized window may be attached.

The window 2 is readily attached to an aircraft window 92 recessed behind a finishing panel 94 having a window opening 96 (FIG. 7) by removing protective strips 78, 80, 82 and 84 and inserting flange 8 into the window 92 through panel window opening 96 to bring the contact adhesive strips 68, 70, 72 and 74 into contact with panel 94. Alternatively expansible bolts can be inserted through openings 86 and into panel 94 before mask 50, polarizer 56 and border member 58 are assembled to frame 4. Advantageously flange 8 bears against the sides of opening 96 and against the frame of window 92 as well as abutting against window pane 98. The window 2 as attached is shown in FIG. 1. It will be evident that window 2 is readily removed for maintenance.

Wide differences in appearance of the window are readily achieved by varying the position of the inner periphery of the mask 50. For example, the mask could be shaped to give an oval window shape in an aircraft whose permanent windows are round or vice versa providing for a major change in the appearance of the aircraft interior. Similarly, the window is readily designed to appear larger or smaller than the permanent aircraft window.

It will be understood that the above embodiment is intended to be illustrative and not limiting.

We claim:

1. An attachable polarized inner window for conveyances comprising:
   a frame member having a rearwardly extending peripheral flange spaced from the outer edges of the back of the frame member and adapted to be inserted into a window recess adjacent its walls.
   a first polarizer rotatably mounted on the frame member forwardly of the flange, a portion of said first polarizer depending below the frame member to provide for manual rotation of the first polarizer.
   a mask mounted on the frame forwardly of the first polarizer, and
   a second polarizer fixedly mounted on the frame forwardly of the mask.

2. An attachable window in accordance with claim 1 in which the first polarizer is mounted in spaced guide members secured to the frame member and said depending portion of the first polarizer has end portions spaced away from the main body of said first polarizer to provide for the rotation of the ends of the depending portion beyond the adjacent guide members.

3. An attachable window in accordance with claim 2 in which the depending portion of the first polarizer limits the clockwise and counterclockwise rotation of the first polarizer by being adapted to engage and adjacent guide members.

* * * * *